Sept. 10, 1968
YOSHIKO SATO
3,400,990
WHEEL-FITTING DEVICE FOR WHEELCHAIRS
Filed Nov. 23, 1966
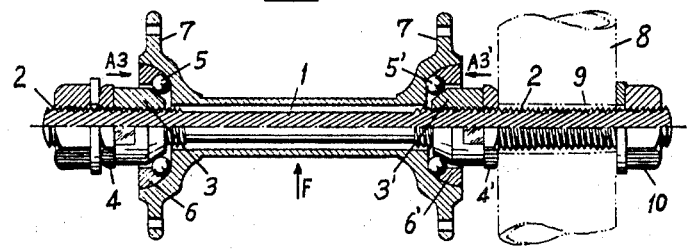
Fig. 1.
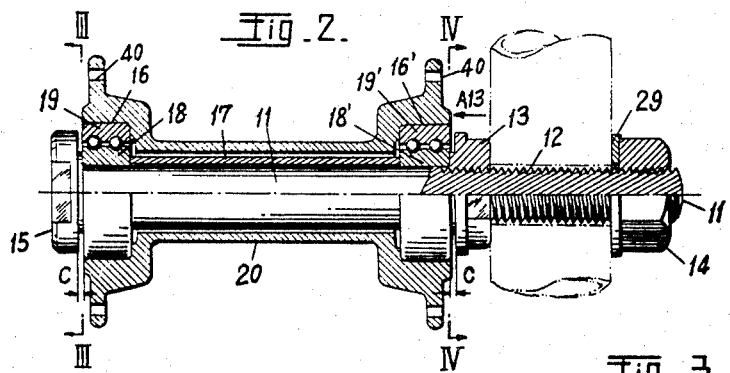
Fig. 2.
Fig. 3.
Fig. 4.
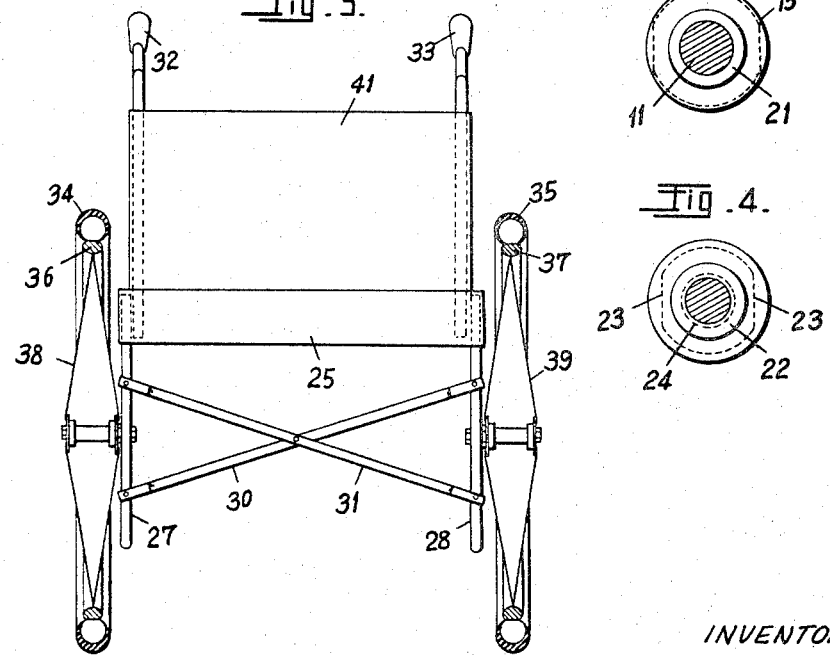
Fig. 5.
INVENTOR
YOSHIKO SATO
BY *Price & Heneveld*
ATTORNEYS

United States Patent Office 3,400,990
Patented Sept. 10, 1968

3,400,990
WHEEL-FITTING DEVICE FOR WHEELCHAIRS
Yoshiko Sato, 8–4 1-chome, Hongo,
Bunkyoku, Tokyo, Japan
Filed Nov. 23, 1966, Ser. No. 596,668
Claims priority, application Japan, Dec. 30, 1965,
40/108,526
4 Claims. (Cl. 308—191)

This invention relates to an improved wheel-fitting device for wheelchairs hand operated by disabled persons.

Because the shaft of wheelchairs is generally fitted to the frame in cantilevered relation for the proper function of wheelchairs, this fitted portion tends to be locally damaged.

The object of the present invention is to provide an improved fitting of a cantilevered shaft to the wheel that enables it to be kept more rigid than heretofore known.

Another object of the present invention is to protect ball bearings from injury by the constriction of nuts when the shaft is inserted to the wheel and the nuts are tightened to adjust the axial displacement of the shaft.

Still another object of this invention is to prevent any one ball bearing from being worn more than the other bearing, especially when the wheelchair is operated by a man of considerably heavy weight or put in use for a long period.

The feature of the present invention resides in that the wheel shaft is provided with two ball bearings and an intermediate pipe is so disposed between said ball bearings that the opposite ends thereof closely abut respectively the inner races of the ball bearings, a hub of the wheel shaft engages the outside of respective outer races of said ball bearings and one end of said shaft is screwed in the frame.

Another feature of the present invention is that when the nuts are firmly tightened to secure the shaft to the wheel, this tightening force does not affect any influence to the rotations of the outer races of said ball bearings and hub.

Other objects and features of the present invention will be more apparent as description is made hereinafter with reference to the accompanying drawings.

FIG. 1 is a longitudinal section view of a conventional wheel-fitting device to the wheelchair, a part thereof cut away.

FIG. 2 is a longitudinal section view of a wheel-fitting device to the wheelchair of the present invention, a part thereof cut away.

FIG. 3 is a section view taken along the line III—III in FIG. 2.

FIG. 4 is a section view taken along the line IV—IV in FIG. 2.

FIG. 5 is a front view of a wheelchair to which the wheel-fitting device of the present invention is applied, a part cut away.

In FIG. 1, there is shown a conventional wheel-fitting device wherein 1 is a wheel shaft having threads 2 at opposite ends to which respective inner races 3 and 3' of ball bearings are engaged. Lock nuts 4 and 4' hold the respective inner races 3 and 3' in position. Outside the inner races 3 and 3' are a series of balls 5, 5' surrounded by respective outer races 6, 6' of ball bearings. Further at the outside of respective outer races 6, 6', opposite ends of a hub 7 engage. One end of said wheel shaft 1 extends beyond the hub 7 and this extended portion is passed through a bore 9 provided in a leg 8 of wheelchair and held by a lock nut 10 at its extreme end.

However, this type of wheel-fitting device has drawbacks in that when the wheelchair is driven and a force F is applied to the shaft 1 (see FIG. 1), the bearing disposed close to the leg 8 is subjected to a heavier load than that disposed remote from the leg 8 so that inner race 3' and outer race 6' get more worn than the inner race 3 and outer race 6. As a result, the hub 7 becomes loose at its ends. This necessitates the tightening of the inner race 3' very frequently in a direction shown by arrow A3' as referred to in FIG. 1. However, if the inner races 3 and 3' are forcibly tightened, there will arise a great compression between the inner races 3, 3' and outer races 6, 6' respectively. This compression, that is the outer race to the inner race, will bring forth a difficulty in the rotation of the wheel. On the other hand, if the compressive force of the inner race is weakened, the hub 7 comes too loose when the wheelchair is driven even a short time. Thus in the actual practice of tightening the inner race 3, there has been great difficulty.

The present invention has overcome this difficulty by furnishing the construction as herein described. Now reference is made to FIG. 2 in which 11 is a wheel shaft having a thread 12 in its right half. On this threaded portion 12, engaged are a clamping nut 13 and lock nut 14. At one end of wheel shaft a flange 15 is formed integrally. Between the flange 15 and said clamping nut 13, two ball bearings 16, 16' are journalled. An intermediate pipe 17 is mounted between said ball bearings 16, 16'.

The opposite ends of pipe 17 abut respective inner races 18, 18' of ball bearings 16, 16'. The outer race 19, 19' of ball bearings 16, 16' securely engages, respectively, the opposite ends of a hub 20. On the inside of said flange 15 is formed a convex 21 concentrically (FIG. 3), to which abuts one side of said inner race 18 so that there is provided a clearance C whereby flange 15 does not contact the outer race 19 (FIG. 2). Said flange 15 has flat portions at its opposite sides to apply a spanner thereto.

Likewise, on one side of clamping nut 13 is formed a convex 22 concentrically (FIG. 4) to which abuts inner race 18' of the other ball bearing 16' so that there is provided a clearance C whereby said clamping nut 13 does not contact outer race 19' (FIG. 2). The opposite sides of this clamping nut are made flat at 23 so that a spanner may be applied thereto. The inside of this nut is made screw threaded at 24.

In fitting wheel shaft 11 to the wheel, the threaded portion 12 of the shaft 11 is inserted into respective leg frames 27, 28 of the wheelchair which is constructed of a seat 25 and back support 41 and others, as seen in FIG. 5, and firmly tightened by a lock nut 14. 29 is a washer. 30 and 31 are stays provided, respectively, between leg frames 27 and 28. 32 and 33 are handles to drive the wheelchair. 34 and 35 are tires. 36 and 37 are rims. 38 and 39 are spokes. 40 is a bore through which spokes pass.

The wheelchair of the present invention is constructed as above. In effecting a tight fit of the shaft, hold the clamping nut with a spanner on its flat sides 23 and then screw the nut 13 in a direction shown by arrow A13. Respective inner races 18, 18' of ball bearings 16, 16' securely abut the opposite ends of the intermediate pipe 17 disposed therebetween, thus acting like an integral wheel shaft. Therefore, no matter how tight the clamping nut 13 may be screwed, this tightening force will not affect any influence to the outer races of ball bearings 16 wherein there will not arise any trouble in the rotation of the outer races. Also, no matter how long the wheelchair has been driven, the hub will not get any displacement in either direction, whereby much time and labor for making frequent adjustment of the clamping nut 13 are saved.

I claim:
1. Wheel shaft-fitting device for wheelchairs, wherein a shaft is externally threaded at one end portion to which a clamping nut and lock nut are threadedly engaged, a flange integrally formed at the other end of the shaft, two ball bearings provided between said flange and clamping nut, an intermediate pipe provided between said ball bearings, a hub of a wheel abuttingly engaging the outside of said ball bearings, a leg frame having a bore, and the threaded end of said wheel shaft passed through said bore provided in said leg frame, said leg frame secured between said clamping nut and lock nut.

2. Wheel shaft-fitting device for wheelchairs as claimed in claim 1, further characterized in that the opposite ends of said intermediate pipe abut the respective inner races of said two ball bearings.

3. Wheel shaft-fitting device for wheelchairs as claimed in claim 1, further characterized in that on one side of said flange is formed concentrically a convexed face to which one end of the respective inner race of said two ball bearings abuts so that there is formed a clearance between the inside of said flange and the outer race of ball bearing.

4. Wheel shaft-fitting device for wheelchairs as claimed in claim 1 further characterized in that on one side of said clamping nut is formed concentrically a convexed face to which one end of the respective inner race of said two ball bearings abuts so that there is formed a clearance between the inside of said clamping nut and the outer race of ball bearing.

References Cited

FOREIGN PATENTS 828,168  1/1952  Germany.

EDGAR W. GEOGHEGAN, *Primary Examiner.*

F. SUSKO, *Assistant Examiner.*